United States Patent
Hwang

[19]

[11] Patent Number: 6,145,185
[45] Date of Patent: Nov. 14, 2000

[54] METHOD FOR FORMING A CONNECTING PIPE OF A HIGH PRESSURE CONNECTOR FOR FLUID

[76] Inventor: Jeng-Yih Hwang, No. 19, Chi Shih St., South Dist., Taichung, Taiwan

[21] Appl. No.: 09/350,553

[22] Filed: Jul. 9, 1999

Related U.S. Application Data

[63] Continuation-in-part of application No. 08/961,982, Oct. 31, 1997, abandoned.

[51] Int. Cl.[7] .................................................. B23P 13/04
[52] U.S. Cl. ............................... 29/557; 29/508; 72/316; 72/318; 148/233
[58] Field of Search ........................... 29/557, 559, 508; 72/357, 358, 370.03, 370.06, 370.1, 370.11, 316, 318, 402; 148/221, 233, 319

[56] References Cited

U.S. PATENT DOCUMENTS

| | | |
|---|---|---|
| 1,560,186 | 11/1925 | Muth . |
| 1,699,688 | 1/1929 | Cross . |
| 1,934,652 | 11/1933 | Anderson . |
| 2,053,975 | 9/1936 | Spatta . |
| 2,065,595 | 12/1936 | Lynch . |
| 2,170,811 | 8/1939 | Cornell . |
| 2,313,116 | 3/1943 | Babcock . |
| 2,722,047 | 11/1955 | Cousino . |
| 2,815,217 | 12/1957 | Fortunski . |
| 2,883,744 | 4/1959 | Barnhart . |
| 2,941,290 | 6/1960 | Heim . |
| 2,989,316 | 6/1961 | Perry et al. . |
| 3,449,937 | 6/1969 | Dimmig . |
| 3,503,123 | 3/1970 | Law . |
| 3,563,082 | 2/1971 | Zapf . |
| 3,568,495 | 3/1971 | Duffield et al. . |
| 3,750,452 | 8/1973 | Frank . |
| 4,243,237 | 1/1981 | Röhm . |
| 4,362,306 | 12/1982 | Röhm . |
| 4,761,873 | 8/1988 | Wetzel et al. . |
| 4,771,933 | 9/1988 | Röhm . |
| 4,845,972 | 7/1989 | Takeuchi et al. . |
| 5,487,294 | 1/1996 | Peterson . |

FOREIGN PATENT DOCUMENTS

| | | |
|---|---|---|
| 58-86938 | 5/1983 | Japan . |
| 60-83735 | 5/1985 | Japan . |
| 179-000 | 4/1986 | Japan . |
| 5-337587 | 12/1993 | Japan . |

*Primary Examiner*—S. Thomas Hughes
*Assistant Examiner*—John C. Hong
*Attorney, Agent, or Firm*—Kirkpatrick & Lockhart LLP

[57] ABSTRACT

A method for forming a pipe includes providing a tubular workpiece having an upper portion and a lower portion; forming a tapered hole in the inner wall of the upper portion of the workpiece and forming an annular shoulder on the outer wall of the upper portion of the workpiece synchronously by cold forging operation; forming a plurality of teeth on the outer wall of the lower portion of the workpiece by a turning-machining operation, thereby forming the pipe which includes the tapered hole, the annular shoulder, and the teeth; and finally reinforcing the pipe by carburizing treatment.

2 Claims, 12 Drawing Sheets

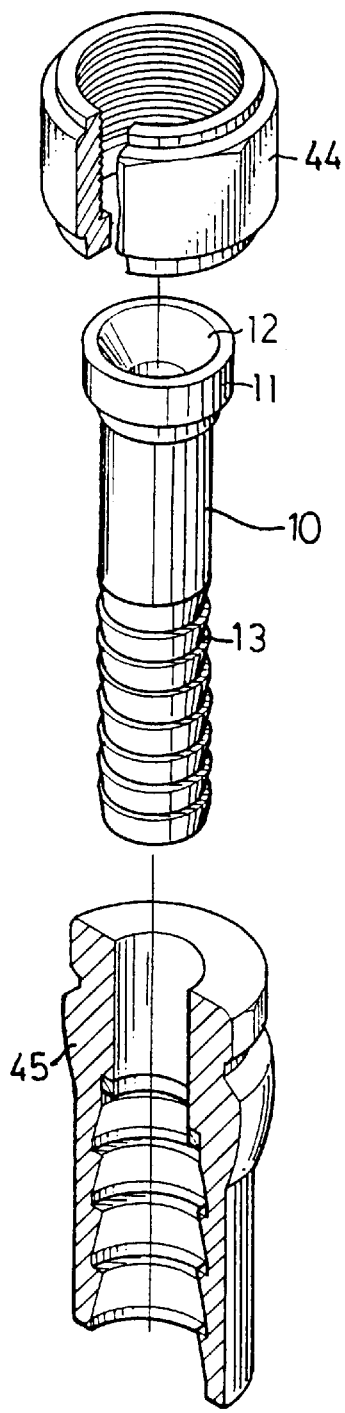
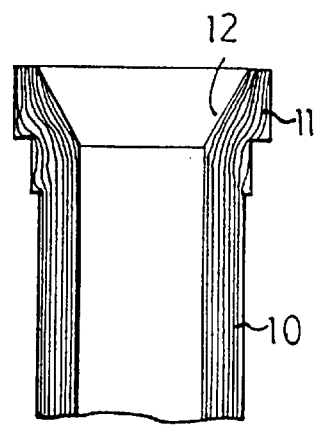
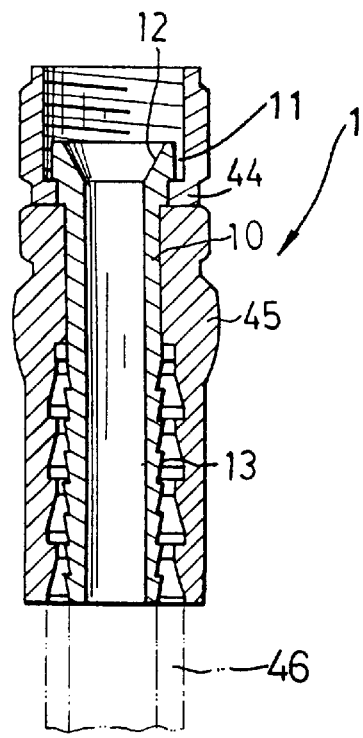
FIG. 2
FIG. 4
FIG. 3

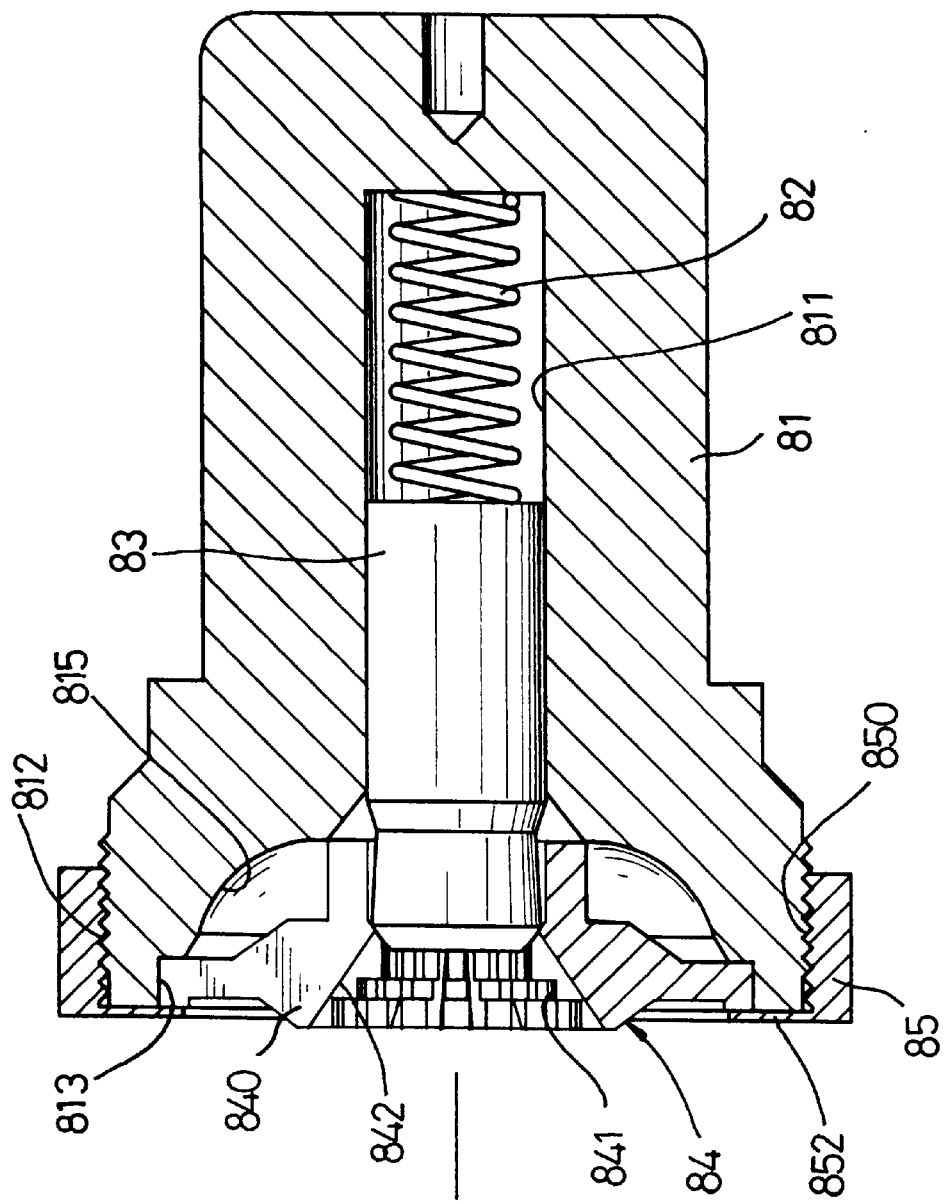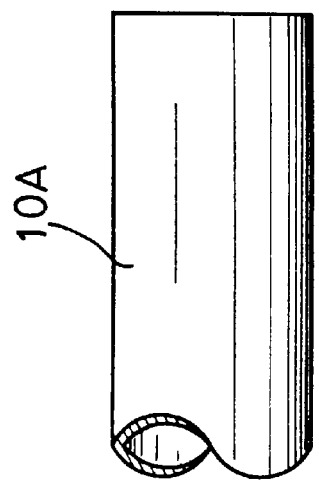
FIG. 9

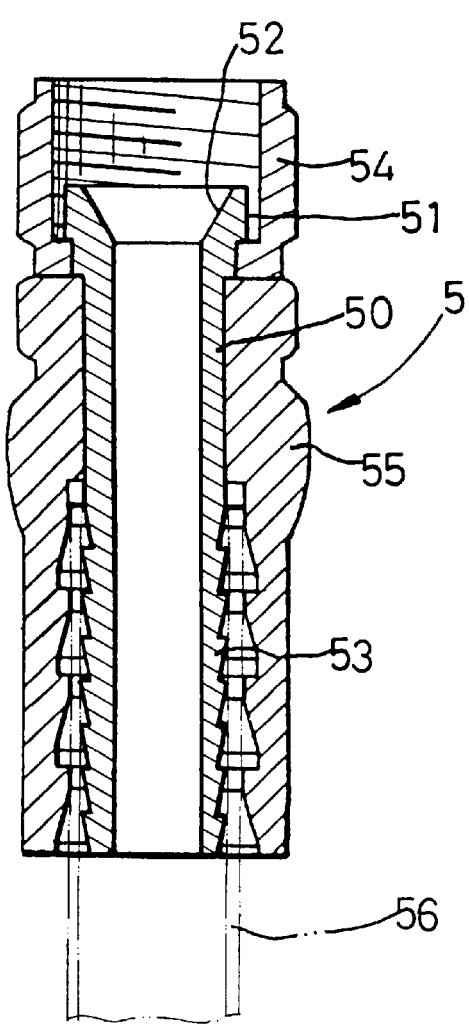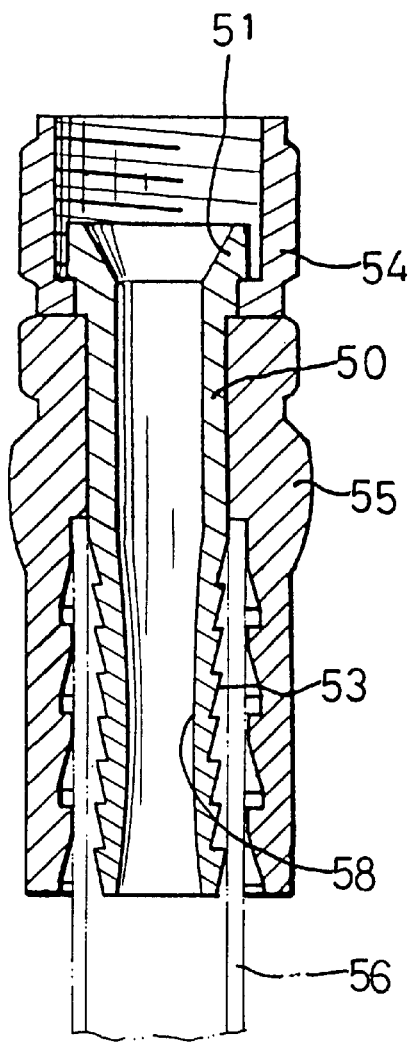
FIG. 14
PRIOR ART
FIG. 15
PRIOR ART 6,145,185

METHOD FOR FORMING A CONNECTING PIPE OF A HIGH PRESSURE CONNECTOR FOR FLUID

CROSS-REFERENCES TO RELATED APPLICATIONS

The present invention is a continuation-in-part application of the U.S. Ser. No. 08/961,982, filed on Oct. 31, 1997, abandoned.

FIELD OF THE INVENTION

The present invention relates to a method for forming a pipe, and more particularly to a method for forming a connecting pipe of a high pressure connector for fluid.

BACKGROUND OF THE INVENTION

The closest prior art of which the applicant is aware is disclosed in U.S. Pat. No. 2,989,316 to R. D. Perry et al., U.S. Pat. No. 3,750,452 to Frank, U.S. Pat. No. 1,934,652 to G. A. Anderson, Japanese Patent No. 5-337587 to Takeda, U.S. Pat. No. 4,243,237, U.S. Pat. No. 4,362,306, and U.S. Pat. No. 4,771,933 (all to Rohm).

With reference to the Takeda reference, it disclosed a method that is used to expand the upper portion (1b) of a tube (1) radially outward as shown in FIG. 1. However, the inner diameter of the upper portion (1b) is greater than that of the tube (1), which means that the wall thickness of the upper portion (1b) is reduced as shown in FIG. 1. In such a manner, when the reduced upper portion (1b) of the tube (1) is connected to a high pressure connector, the reduced upper portion (1b) cannot entirely withstand the high pressure and pulse exerted by the high pressure connector, thereby easily breaking the tube (1) at the reduced upper portion (1b).

With reference to the Anderson reference, it disclosed a method for extruding a slug (1) made of a suitable metal such as aluminum into a cop tube (13). A punch (10) is forced downward to enter the bore (2) of the slug (1). Pressure on the punch (10) will result in an extrusion of the metal of the slug (1) downward through the bore (5), and hence away from the punch (10), resulting in the production of a tubular cylinder (13). As the tube (13) is extruded, it will depress the plunger (7) against the tension of the spring (9) and this die operation is continued until only a sufficient metal is left in the bore (12) to form a head (14) on the tube (13). When the punch is retracted, the pressure of the coiled spring (9) will then force the tube (13) upward, thereby ejecting it from the die (3). The cop tube (13) as thus formed is clearly illustrated in FIG. 4 (column 2, lines 25–55). Accordingly, the slug (1) with a short length as shown in FIG. 2 is continuously extruded to be elongated into the cop tube (13) as shown in FIGS. 3 and 4, finally leaving the head (14) on the cop tube (13). In such a manner, such a method is only suitable for extruding a soft metal such as aluminum, copper, lead and the like, and cannot be used to machine a solid metal. When the head (14) of the tube (13) is connected to a high pressure connector, it cannot entirely withstand the high pressure and impact exerted by the high pressure connector, thereby easily breaking the tube (13) at the head (14).

With reference to the R. D. Perry et al. reference, it disclosed a chuck or collet (36) which has a fixed diameter such that it is used to clamp workpieces of the same diameter only, and cannot be used to clamp workpieces of different diameters, thereby greatly limiting the versatility of the chuck (36) such that the chuck (36) has to be replaced when the intent is to machine workpieces of different diameters, thereby causing inconvenience to an operator.

With reference to the Frank reference, it disclosed a collet assembly (20) including a circular array of rigid segments or jaws (23) having outer tapered surfaces complementary to the surface of the tapered bore (21) of the die ring (19) (column 3, lines 5–10). However, when a workpiece is gripped in the jaws (23) of the collet assembly (20) to be machined by a lathe, it is difficult to machine the workpiece by turning-machining operation, thereby causing inconvenience to the operator. In addition, the workpiece is clamped between the cone-shaped walls of the jaws (23) such that the workpiece has to be deeply inserted into the jaws (23) of the collet assembly (20) so as to provide a secure grip to position the workpiece in place. In such a manner, the surface of the workpiece to be machined is decreased. Further, the jaws (23) of the collet assembly (20) are used to clamp workpieces of smaller diameters only, and cannot be used to securely clamp workpieces of larger diameters, thereby greatly limiting the versatility of the collet assembly (20) such that the jaws (23) of the collet assembly (20) have to be replaced when the intent is to machine workpieces of larger diameters, thereby causing inconvenience to the operator.

Both of the Perry et al. and Frank references use an inclined plane to press a workpiece so as to clamp the workpiece in place. However, it is necessary to exert a great force so as to clamp the workpiece, thereby causing inconvenience to the user. In addition, the workpiece has a great length to be deeply inserted into the collet assembly to facilitate the inclined plane securely clipping the workpiece, thereby reducing the area of the working surface of the workpiece to be machined.

A conventional method in accordance with the prior art shown in FIGS. 13–15 is used for forming a connecting pipe (50) of a high pressure connector (5) for fluid which includes an upper sleeve (54) fitted on an annular shoulder (51) of the connecting pipe (50), a lower sleeve (55) securely fitted on the connecting pipe (50), and a hose (56) clamped between a plurality of teeth (53) of the connecting pipe (50) and the lower sleeve (55). The method comprises providing a tubular workpiece (not shown); performing a first turning-machining operation on the upper portion of the workpiece so as to form the annular shoulder (51); performing a second turning-machining operation on the upper portion of the workpiece so as to form a tapered hole (52) in the workpiece; performing a third turning-machining operation on the lower portion of the workpiece so as to form a plurality of teeth (53); and finally performing a fine turning-machining operation on the workpiece so as to finish the teeth (53). By such a process, the outer diameter of the teeth (53) is significantly smaller than that of the annular shoulder (51) such that it is necessary to remove the surface material of the workpiece during the turning-machining operations which is time consuming, thereby causing waste in time and cost. In addition, the teeth (53) are formed by means of turning-machining rather than forging and so have a low strength such that the inner wall (58) of the connecting pipe (50) located adjacent to the teeth (53) is easily deformed due to a high pressure. The present invention has arisen to mitigate and/or obviate the disadvantage of the conventional method for forming a connecting pipe of a high pressure connector.

SUMMARY OF THE INVENTION

In accordance with one aspect of the present invention, there is provided a method for forming a pipe comprising the steps of providing a tubular workpiece having an upper portion and a lower portion; forming a tapered hole in the inner wall of the upper portion of the workpiece and an annular shoulder on the outer wall of the upper portion of the workpiece synchronously by means of a cold forging operation; forming a plurality of teeth on the outer wall of the lower portion of the workpiece by means a of turning machining, thereby forming the pipe which includes the tapered hole, the annular shoulder, and the teeth; and finally reinforcing the pipe by means of carburizing treatment.

Further features of the present invention will become apparent from a careful reading of the detailed description with appropriate reference to the accompanying drawings.

BRIEF DESCRIPTION OF THE DRAWINGS

FIG. 2 is a partially cut-away exploded view of a high pressure connector for fluid according to the present invention;

FIG. 3 is a front plan cross-sectional assembly view of the connector shown in FIG. 2;

FIG. 4 is a partially cut-away front plan view of a connecting pipe according to the present invention;

FIG. 9 is a front plan cross-sectional view of the fastener member as shown in FIG. 7;

FIGS. 14 and 15 are front plan cross-sectional views of a conventional oil pressure connector according to the prior art.

DETAILED DESCRIPTION OF THE PREFERRED EMBODIMENTS

Figure 1:
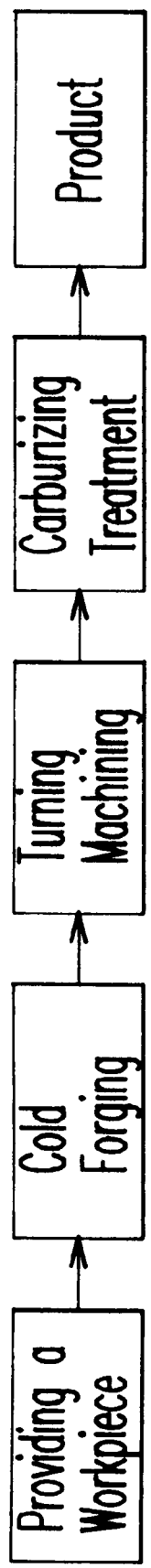
FIG. 1 is a flow chart of a method for forming a connecting pipe of a high pressure connector for fluid according to the present invention.

Referring now to FIGS. 1–3, a method according to the present invention can be provided for forming a connecting pipe (10) of a high pressure connector (1) for fluid which includes an upper sleeve (44) fitted on an annular shoulder (11) of the connecting pipe (10), a lower sleeve (45) securely fitted on the connecting pipe (10), and a hose (46) clamped between the connecting pipe (10) and the lower sleeve (45).

The method comprises the steps of: providing a tubular workpiece (10A) (see FIG. 5); forming a tapered hole (12) in the inner wall of the upper portion of the workpiece (10A) and forming the annular shoulder (11) on the outer wall of the upper portion of the workpiece (10A) synchronously by means of a cold forging operation; forming a plurality of teeth (13) on the outer wall of the lower portion of the workpiece (10A) by means of a turning-machining operation, thereby forming the workpiece (10A) into the pipe (10) which includes the tapered hole (12), the annular shoulder (11) and the teeth (13); and reinforcing the pipe (10) by means of a carburizing treatment.

Figure 5:
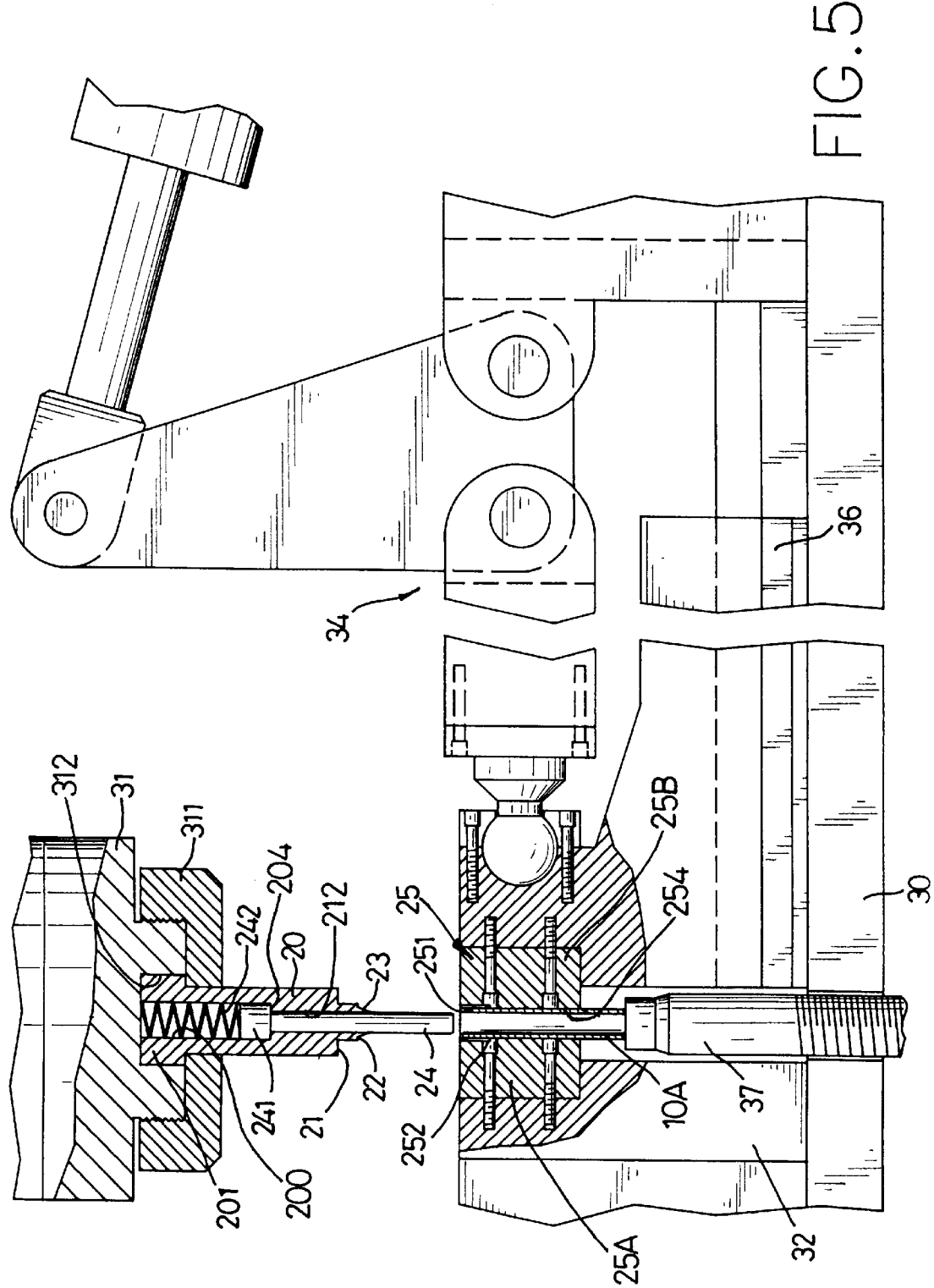
FIG. 5 is a front plan partially cross-sectional view showing a cold forging operation of the connecting pipe.
Figure 6:
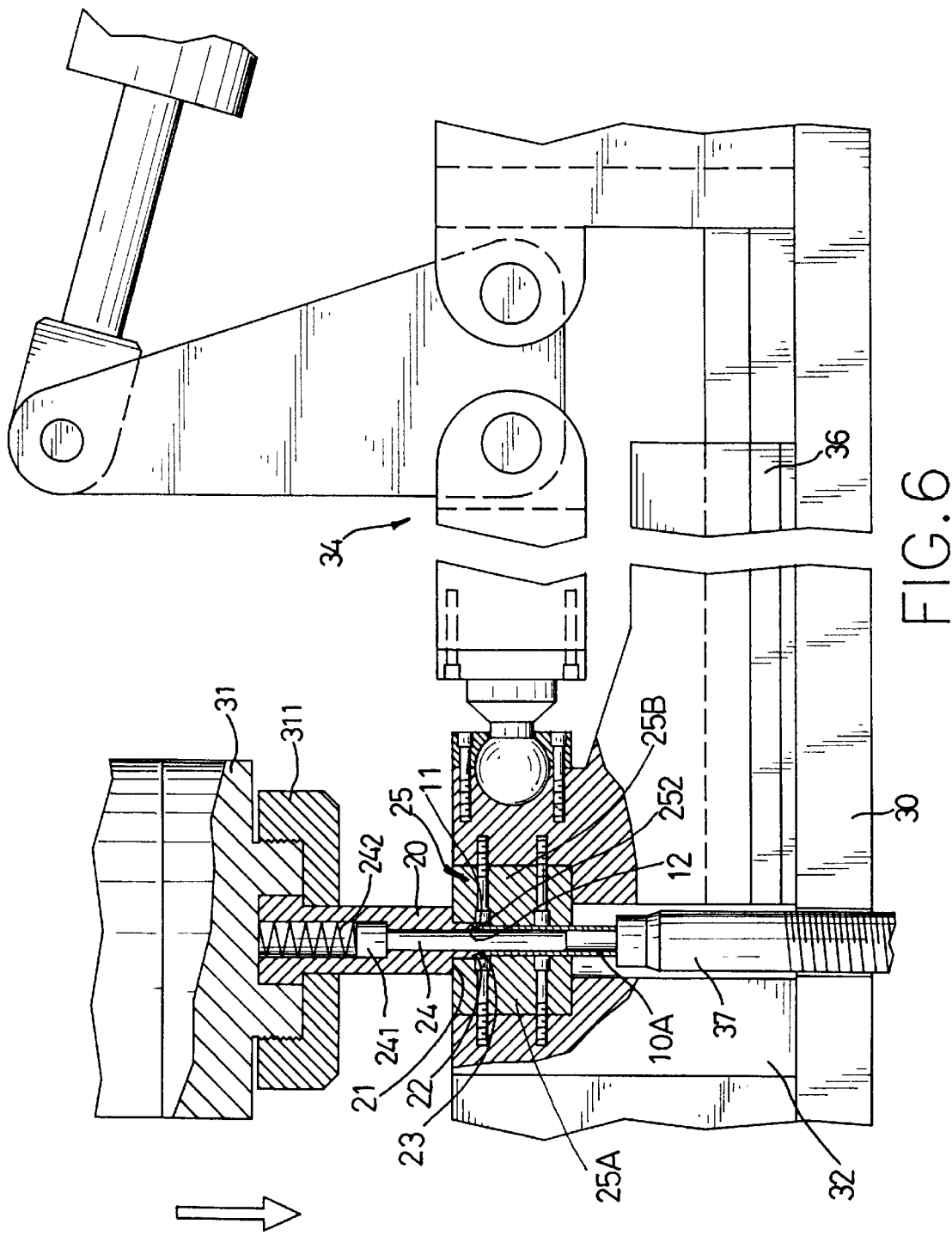
FIG. 6 is an operational view of FIG. 5.
Figure 7:
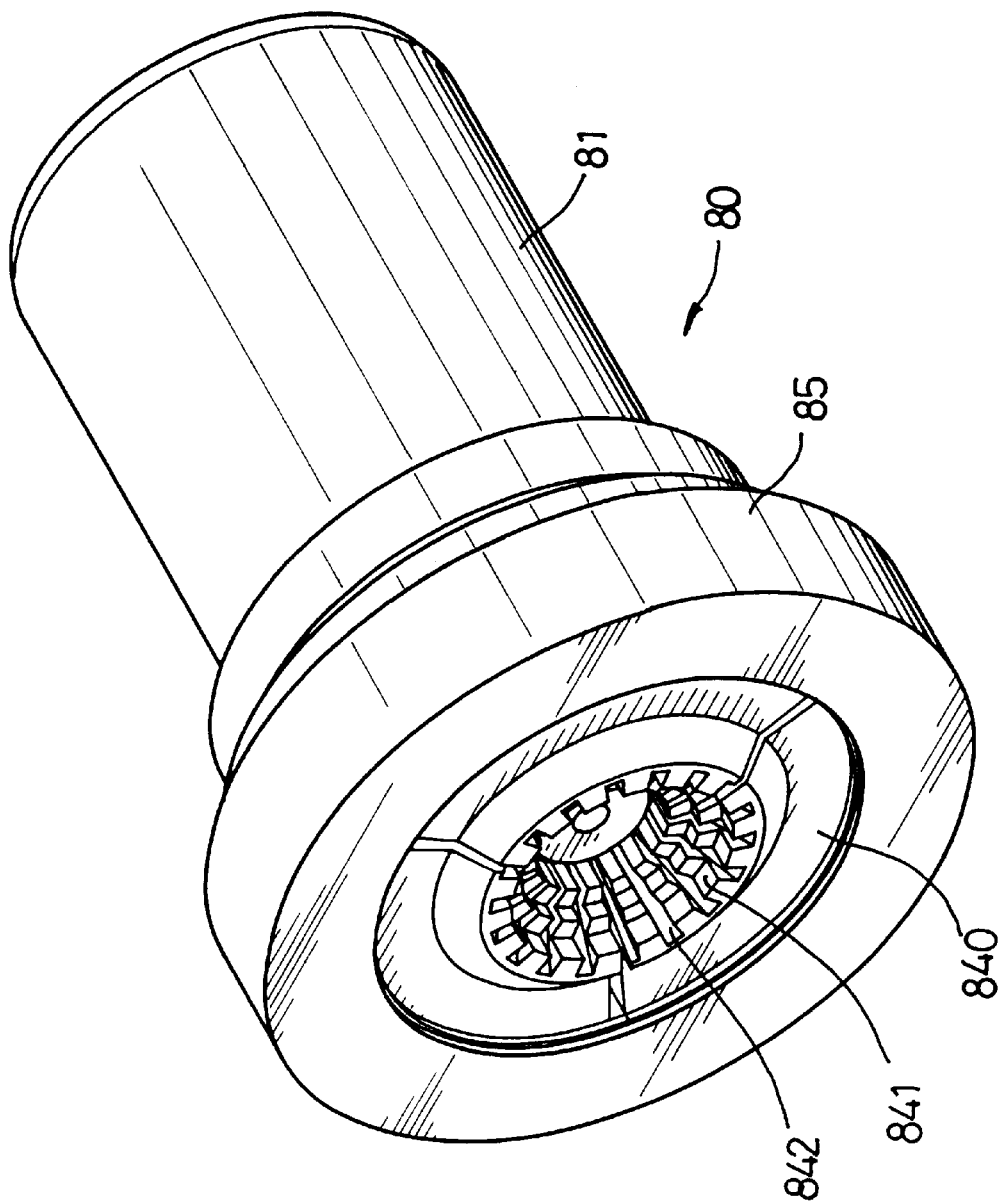
FIG. 7 is a perspective view of a fastener member in accordance with the present invention.
Figure 8:
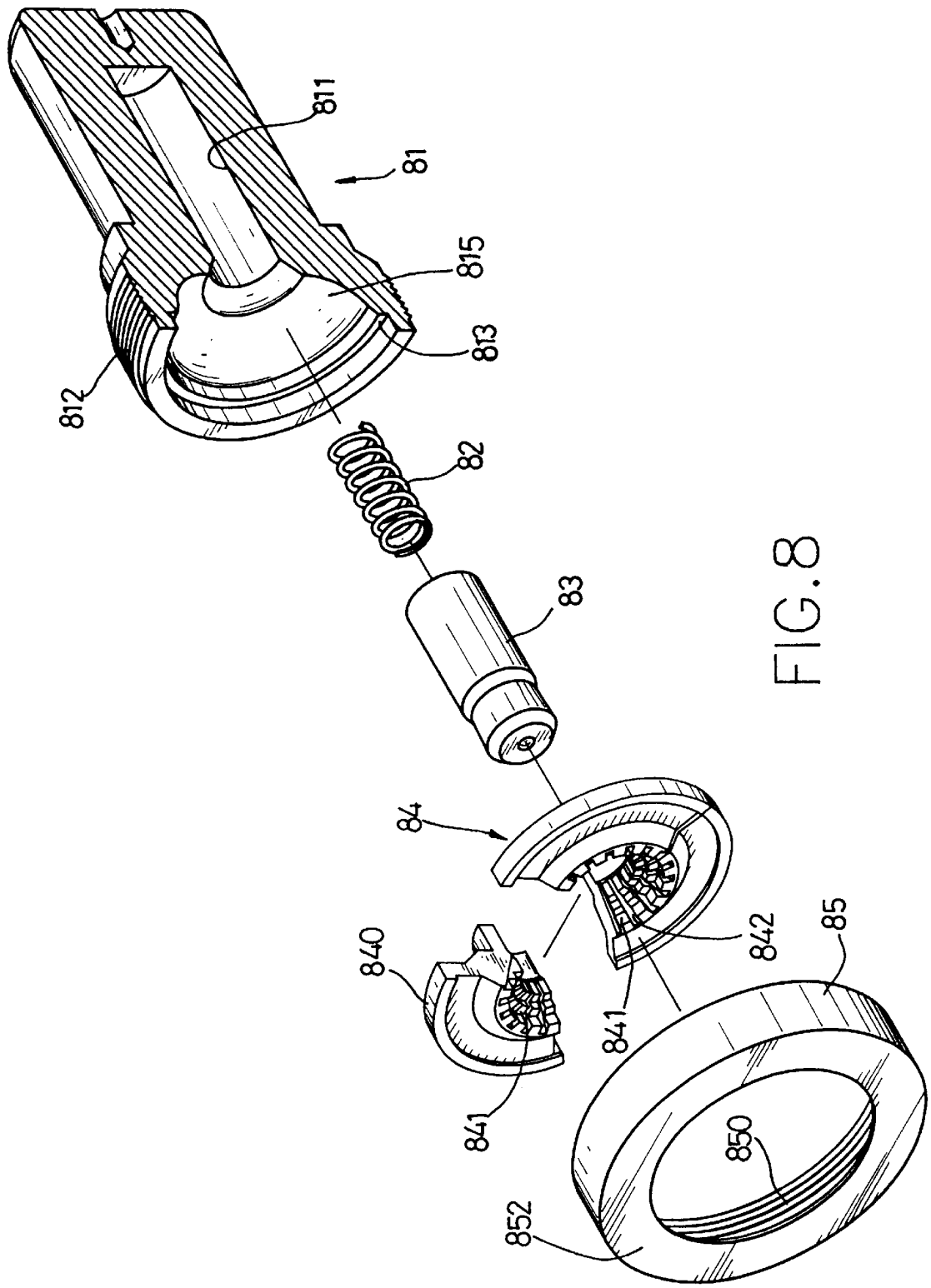
FIG. 8 is a partially cross-sectional exploded view of the fastener member as shown in FIG. 7.

Referring to FIGS. 5 and 6 with reference to FIGS. 2–4, in the step of cold forging the workpiece (10A), a female die (25) is mounted in a working table (30) and includes a lower portion defining a passage (254) tightly receiving the workpiece (10A) therein, and an upper portion defining a cavity (251) having a diameter greater than that of the workpiece (10A) such that a space is defined between the upper portion of the workpiece (10A) and the inner wall of the cavity (251), and a flange (252) is formed between the cavity (251) and the passage (254). An abutting post (37) is fixedly mounted in the working table (30) for supporting the workpiece (10A).

A male die (20) is fixedly mounted on a mobile base (31) to move relative to the female die (25) and includes a lower portion (21) having an abutting edge (22) which can be moved to press the workpiece (10A) for forming the annular shoulder (11) on the workpiece (10A), and a tapered portion (23) formed on the underside of the abutting edge (22) for forming the tapered hole (12) in the workpiece (10A). An end cap (311) is threadedly mounted on the mobile base (31) for retaining an enlarged head (201) of the male die (20) in a recess (312) defined in the mobile base (31), thereby fixing the male die (20) to the mobile base (31). A first channel (200) is defined in the upper portion of the male die (20) for receiving an enlarged head (241) of a retaining axle (24), and a second channel (212) is defined in the lower portion (21) of the male die (20) for receiving the retaining axle (24) and having a diameter smaller than that of the first channel (200), thereby forming a stop (204) between the first channel (200) and the second channel (212) for retaining the enlarged head (241). A biasing member (242) is received in the first channel (200) and is urged between the enlarged head (241) and the mobile base (31). By such an arrangement, the retaining axle (24) can be moved with the male die (20) to be inserted into the workpiece (10A).

In operation, the male die (20) can moved relative to the female die (25) from the position as shown in FIG. 5 to the position as shown in FIG. 6 such that the abutting edge (22) can be pressed on the upper portion of the workpiece (10A) and the tapered portion (23) can be inserted into the upper portion of the workpiece (10A) to urge the upper portion of the workpiece (10A) radially and outward, thereby forming the annular shoulder (11) and the tapered hole (12) on the upper portion of the workpiece (10A) as shown in FIG. 6. The retaining axle (24) inserted into the workpiece (10A) can function to prevent the inner wall of the workpiece (10A) from being deformed inward during the squeezing process. In addition, if the retaining axle (24) is integrally formed with the male die (20), when the male die (20) contacts the workpiece (10A), the workpiece (10A) is squeezed inward by the male die (20) to clamp the retaining axle (24). When the male die (20) continues to move downward, a significant friction is produced between the retaining axle (24) and the workpiece (10A) to push the workpiece (10A) downward, thereby shortening the length of the workpiece (10A). Therefore, the retaining axle (24) is made to separate from the male die (20).

The female die (25) includes a first half (25A) fixedly mounted on a fixed base (32) of the working table (30), and a second half (25B) fixedly mounted on a sliding base (36) of the working table (30). The second half (25B) together with the sliding base (36) can be moved rightward by means of a transmission mechanism (34) after the annular shoulder (11) and the tapered hole (12) have been formed on the workpiece (10A) such that the workpiece (10A) can be released from the female die (25) for further operation.

Referring to FIGS. 7–10 with reference to FIGS. 2 and 3, a fastener member (80) such as a collet can be mounted on a lathe (not shown) for securely clamping the upper portion of the workpiece (10A) for facilitating a turning-machining operation of the workpiece (10A) so as to form the plurality of teeth (13) on the lower portion of the workpiece (10A).

The fastener member (80) comprises a positioning base (81) having a first portion defining a first chamber (811) and a second portion having an inner wall (813) defining a second chamber (815) communicating with the first chamber (811), a cone-shaped clamping member (84) received in the second chamber (815) of the inner wall (813) of the positioning base (81) and including three separate abutting pieces (840) each having a first side facing the first chamber (811) and a second side having a flared inner wall (842) formed with a plurality of spaced stepwise urging portions (841) for clamping the upper portion of the workpiece (10A), a returning rod (83) slidably received in the first chamber (811) and having a first end portion abutting the first side of each of the three abutting pieces (840), and a biasing member (82) received in the first chamber (811) and urged between a second end portion of the returning rod (83) and the wall of the first chamber (811) of the positioning base (81).

The second portion of the positioning base (81) is formed with an outer thread (812), and the fastener member (80) further comprises an end cap (85) formed with an inner thread (850) engaged with the outer thread (812) and having an annular limiting edge (852) abutting each of the three abutting pieces (840) for retaining the clamping member (84).

Figure 10:
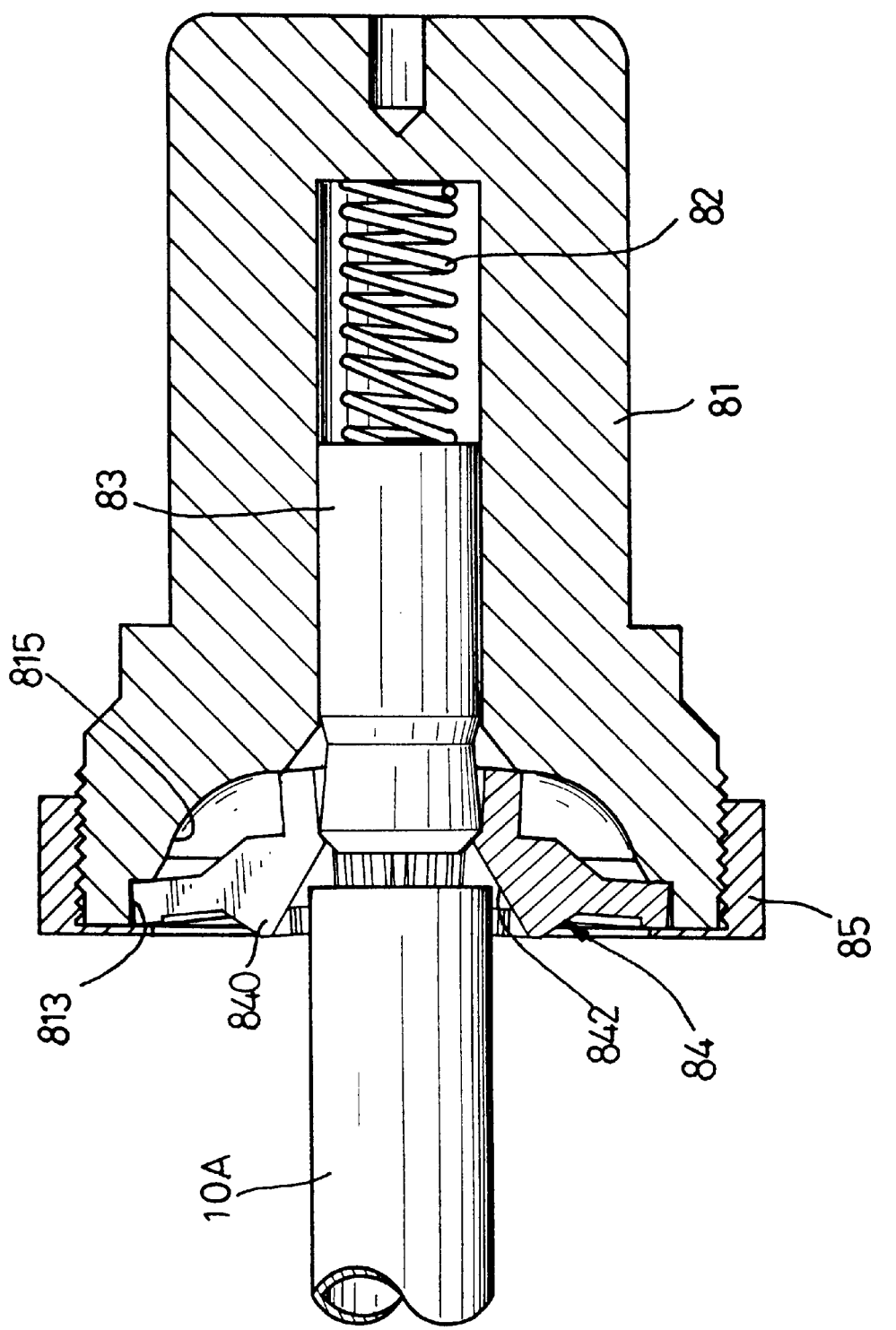
FIG. 10 is an operational view of the fastener member as shown in FIG. 7.
Figure 11:
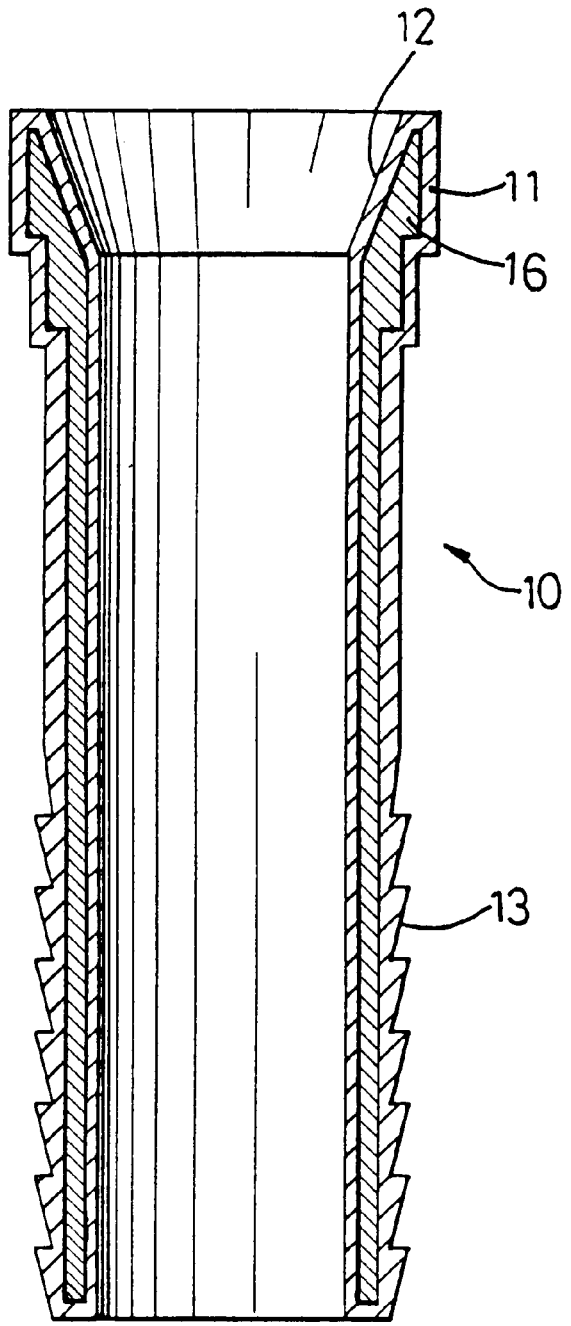
FIG. 11 is a front plan cross-sectional view of the connecting pipe.

In operation, the upper portion of the workpiece (10A) as shown in FIG. 9 can be moved rightward to press the stepwise urging portions (841) of each of the three abutting pieces (840) such that each of the three abutting pieces (840) can be slightly rotated counterclockwise relative to the workpiece (10A) by means of a lever action to press the upper portion of the workpiece (10A) as shown in FIG. 10, thereby securely clamping the upper portion of the workpiece (10A). An press pin (not shown) then abut the lower portion of the workpiece (10A), thereby facilitating performing turning-machining the workpiece (10A) so as to form the teeth (13) on the lower the workpiece (10A) as shown in FIG. 2. The workpiece (10A) which has been processed by means of cold forging and turning-machining operations can be formed into the connecting pipe (10) as shown in FIG. 11 which includes the annular shoulder (11), the tapered hole (12) and the plurality of teeth (13). Finally, the connecting pipe (10) can be processed by means of carburizing treatment so as to remove the residue stress on the connecting pipe (10), thereby reinforcing the strength of the annular shoulder (11), the tapered hole (12) and the plurality of teeth (13). It is appreciated that an intermediate portion (16) of the connecting pipe (10) is not processed by the carburizing treatment yet the toughness of the connecting pipe (10) is not decreased.

Figure 12:
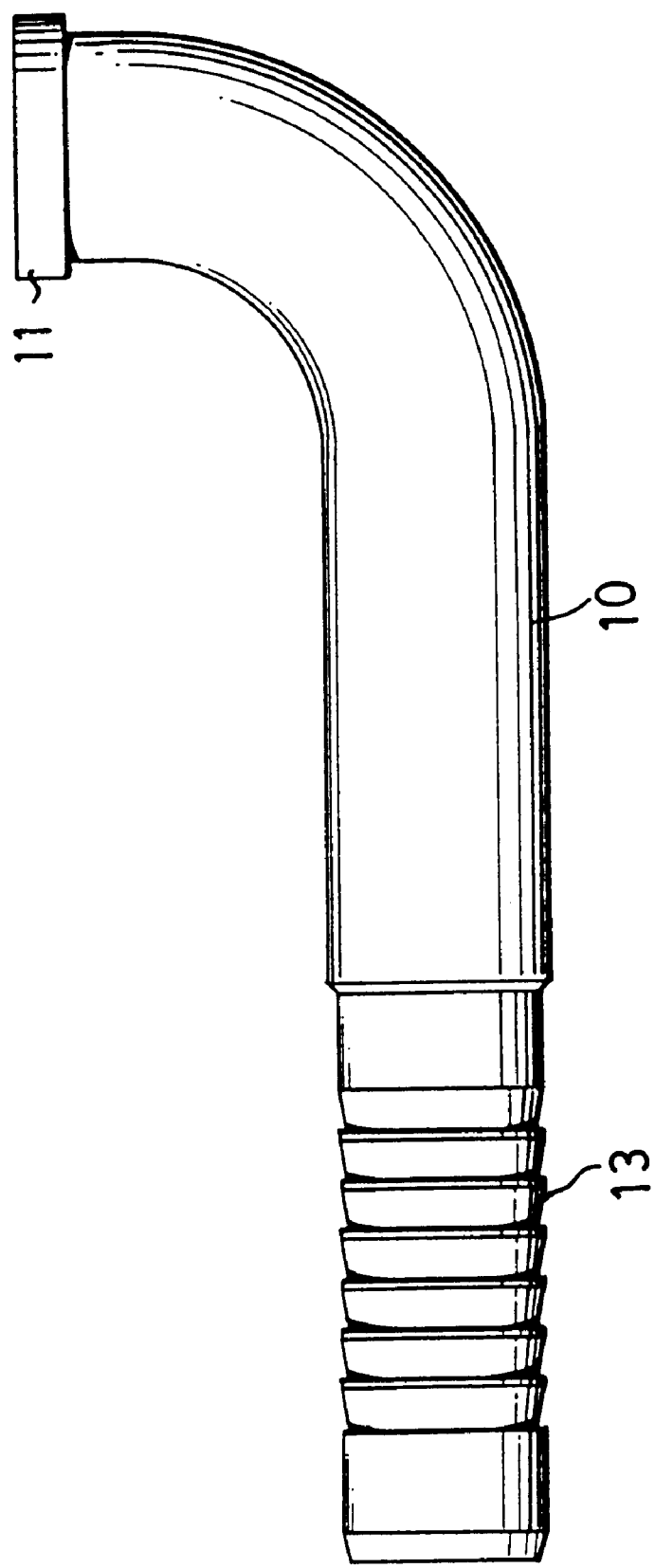
FIG. 12 is a front plan view of a connecting pipe in accordance with another embodiment of the present invention.
Figure 13:
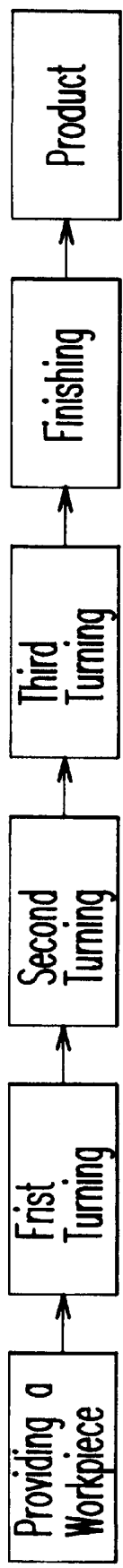
FIG. 13 is a conventional method for forming a connecting pipe of a high pressure connector for fluid in accordance with the prior art.

Referring now to FIG. 12, according to another embodiment of the present invention, the workpiece (10A) can be initially formed with the annular shoulder (11) by means of cold forging, then be formed with the plurality of teeth (13) by means of a turning-machining operation, and finally be bent so as to form a bent connecting pipe (10).

By such a method and arrangement, the annular shoulder (11) together with the tapered hole (12) is formed by means of cold forging and the teeth (13) are formed by means of a turning-machining operation synchronously performed with the cold forging without repeated and time consuming turning machining processes, thereby saving time and cost. In addition, the teeth (13) are reinforced by means of carburizing treatment to have a great strength and rigidity such that the inner wall of the connecting pipe (10) located adjacent to the teeth (13) will not be deformed owing to a high pressure thereon.

In comparison with the prior art references, in the Takeda reference, the mandrel is fixed in the mobile die without a cushioning space. In the present invention, when the retaining axle (24) is inserted into the workpiece (10A), the male die (20) is allowed to continue to move downward to press the workpiece (10A) by means of the action of the biasing member (242), thereby providing a cushion space to the retaining axle (24). When the male die (20) is removed from the workpiece (10A), the retaining axle (24) is returned to its original position by means of the biasing member (242). In addition, the shoulder (11) and the tapered hole (12) are formed by the male die (20) co-operating with the female die (25). The retaining axle (24) is used to maintain the diameter of the inner wall of the workpiece (10A).

The Takeda reference does not disclose a process for forming a tapered hole in the inner wall of the upper portion of the tube by means of a cold forging operation as is disclosed in the present invention. In addition, the Anderson reference does not disclose a process for forming a tapered hole in the inner wall of the head of the tube by means of a cold forging operation, as is disclosed in the present invention.

In accordance with the present invention, a tubular workpiece (10A) is initially received in a female die (25), a male die (20) is then moved relative to the female die (25) to press the upper portion of the tubular workpiece (10A), wherein the male die (20) includes a lower portion having an abutting edge (22) which can be moved to press the upper portion of the tubular workpiece (10A) to form the annular shoulder (11) on it, and a tapered portion (23) formed on the bottom of the abutting edge (22) to form the tapered hole (12) in the workpiece (10A). Accordingly, the annular shoulder (11) and the tapered hole (12) are formed on the upper portion of the tubular workpiece (10A) by means of the abutting edge (22) together with the tapered portion (23) of the male die (20) continuously pressing and squeezing the upper portion of the tubular workpiece (10A) such that the annular shoulder (11) and the tapered hole (12) thus formed have a compact structure with a strengthened rigidity. In such a manner, when the annular shoulder (11) of the workpiece (10A) is connected to a high pressure connector, it can withstand the high pressure and impact exerted by the high pressure connector.

On the other hand, both of the Perry et al. and Frank references use an inclined plane to press a workpiece so as to clamp the workpiece in place. However, it is necessary to exert a great force so as to clamp the workpiece, thereby causing inconvenience to the user. In addition, the workpiece has a great length to be deeply inserted into the collet assembly to facilitate the inclined plane securely clipping the workpiece, thereby reducing the area of the working surface of the workpiece to be machined.

In accordance with the present invention, the upper portion of the workpiece (10A) as shown in FIG. 9 is moved right by an external force to press the stepwise urging portions (841) of the three abutting pieces (840) of the clamping member (84) of the fastener member such that each of the three abutting pieces (840) can be slightly rotated relative to the workpiece (10A) to press the upper portion of the workpiece (10A) as shown in FIG. 10, thereby securely clamping the workpiece (10A) to facilitate the turning-machining operation of the workpiece (10A). In such a manner, the workpiece (10A) is easily inserted into the fastener member (80) and can be securely clamped by the fastener member (80). In addition, the workpiece (10A) can be easily machined by the turning-machining operation simply by means of clamping the upper portion of the workpiece (10A), with the press pin abutting the lower portion of the workpiece (10A), thereby increasing the working surface of the workpiece (10A) to be machined.

When the external force is removed, the workpiece (10A) is pushed to be removed from the clamping member (84) by the returning force exerted by the biasing member (82), and each of the three abutting pieces (840) is then returned its original location. When the intent is to clamp a workpiece whose diameter is much different from the dimensions of the clamping member (84), the end cap (85) can be easily removed from the positioning base (81) so as to replace the clamping member (84), thereby facilitating the user to work the workpiece so as to save the manual force. In such a manner, each of the abutting pieces (840) of the clamping member (84) can be used to securely clamp workpieces (10A) of different diameters by means of pressing of the stepwise urging portions (841), thereby increasing the versatility of the clamping member (84) of the fastener member (80). In addition, the clamping member (84) can be replaced easily.

It should be clear to those skilled in the art that further embodiments of the present invention may be made without departing from the spirit and scope of the present invention.

What is claimed is:

1. A method for forming a pipe (10) comprising the steps of:

providing a tubular workpiece (10A) having an upper portion and a lower portion;

providing a female die (25) having a lower portion defining a passage (254) for receiving said workpiece (10A), an upper portion defining a cavity (251) having a diameter greater than that of said workpiece (10A), a space defined between said upper portion of said workpiece (10A) and the wall of said cavity (251) when said workpiece (10A) is inserted into said female die (25), and a flange (252) formed between said cavity (251) and said passage (254);

providing a male die (20) to move relative to said female die (25), said male die (20) including an upper portion defining a first channel (200), and a lower portion (21) defining a second channel (212) having a diameter smaller than that of said first channel (200), thereby forming a stop (204) between said first channel (200) and said second channel (212), said lower portion (21) of said male die (20) having an abutting edge (22), and a tapered portion (23) formed on the underside of said abutting edge (22);

providing a retaining axle (24) which can be moved with said male die (20) to be inserted into said workpiece (10A), said retaining axle (24) received in said second channel (212) and including an enlarged head (241) received in said first channel (200) and retained by said stop (204);

providing a biasing member (242) received in said first channel (200) and urged on said enlarged head (241);

inserting said workpiece within said female die (25);

moving said male die (20) relative to said female die (25) to contact said tapered portion (23) and said abutting edge (22) of said male die (20) against said workpiece (10A), said tapered portion (23) contacting said workpiece (10A) to form a tapered hole (12) in an inner wall of said upper portion of said workpiece (10a), and said abutting edge (22) contacting said workpiece (10A) to form an annular shoulder (11) on an outer wall of said upper portion of said workpiece (10A) by means of a cold forging operation;

providing a fastener member (80) securely clamping said upper portion of said workpiece (10A), said fastener member (80) including a positioning base (81) having a first portion defining a first chamber (811) and a second portion having an inner wall (813) defining a second chamber (815) in communication with said first chamber (811), a cone-shaped clamping member (84) received in said second chamber (815) of said inner wall (813) of said positioning base (81) and including three separate abutting pieces (840) each having a first side facing said first channel (811) and a second side having a flared inner wall (842) formed with a plurality of spaced stepwise urging portions (841) for clamping said upper portion of said workpiece (10A), a returning rod (83) slidably received in said first chamber (811) and having a first end portion abutting said first side of each of said three abutting pieces (840), and a biasing member (82) received in said first chamber (811) and pressing between a second end portion of said returning rod (83) and said positioning base (81);

moving said upper portion of said workpiece (10A) toward said fastener member (80) and securely clamping said upper portion of said workpiece (10A) in said fastener member (80);

forming a plurality of teeth (13) on an outer wall of said lower portion of said workpiece (10A) by means of a turning-machining operation, thereby forming said pipe (10) which includes said tapered hole (12), said annular shoulder (11) and said teeth (13); and reinforcing said pipe (10) by means of carburizing treatment.

2. The method according to claim 1, wherein said providing a fastener member further comprises providing an outer thread (812) formed in the second portion of said positioning base (81); and providing an end cap (85) which is formed with an inner thread (850) engaged with said outer thread (812) and has an annular limiting edge (852) abutting each of said three abutting pieces (840) for retaining said clamping member (84).

* * * * *